United States Patent
Matsumoto (10) Patent No.: US 9,466,434 B2
(45) Date of Patent: Oct. 11, 2016

(54) DYE-SENSITIZED SOLAR CELL

(71) Applicant: FUJIKURA LTD., Tokyo (JP)

(72) Inventor: Daisuke Matsumoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/554,582

(22) Filed: Nov. 26, 2014

(65) Prior Publication Data
US 2015/0083218 A1   Mar. 26, 2015

Related U.S. Application Data (63) Continuation of application No. PCT/JP2013/055102, filed on Feb. 27, 2013.

(30) Foreign Application Priority Data

May 30, 2012 (JP) ................. 2012-123033

(51) Int. Cl.
*H01G 9/20* (2006.01)

(52) U.S. Cl.
CPC ........... *H01G 9/2031* (2013.01); *Y02E 10/542* (2013.01)

(58) Field of Classification Search
CPC .................................................. H01G 9/2031
See application file for complete search history.

(56) References Cited

U.S. PATENT DOCUMENTS

| | | | |
|---|---|---|---|
| 6,300,559 B1 | 10/2001 | Ohmori | |
| 7,995,871 B2* | 8/2011 | Guerra | H01G 9/2031 257/432 |
| 8,604,339 B2* | 12/2013 | Park | H01G 9/2027 136/263 |
| 8,673,810 B2* | 3/2014 | Zhao | B01J 21/063 423/610 |
| 2003/0155583 A1 | 8/2003 | Matsui et al. | |

(Continued)

FOREIGN PATENT DOCUMENTS

| | | |
|---|---|---|
| JP | 2000-340269 A | 12/2000 |
| JP | 2003142171 A | 5/2003 |

(Continued)

OTHER PUBLICATIONS

International Search Report of PCT/JP2013/055102 dated Apr. 16, 2013.

(Continued)

*Primary Examiner* — Golam Mowla
(74) *Attorney, Agent, or Firm* — Sughrue Mion, PLLC (57) ABSTRACT

Provided is a dye-sensitized solar cell which includes a working electrode having a porous titanium oxide layer on a conductive substrate, and a photosensitizing dye supported on the porous titanium oxide layer, in which the porous titanium oxide layer contains an anatase crystal-type $TiO_2$ and a rutile crystal-type $TiO_2$, the porous titanium oxide layer includes a plurality of layers, an outermost layer disposed at a position farthest from the conductive substrate contains the rutile crystal-type $TiO_2$, at least one intermediate layer provided between the outermost layer and the conductive substrate contains the anatase crystal-type $TiO_2$, a first intermediate layer disposed at a position closest to the outermost layer contains the anatase crystal-type $TiO_2$ and the rutile crystal-type $TiO_2$, and a content of the rutile crystal-type $TiO_2$ in the outermost layer is greater than that of the rutile crystal-type $TiO_2$ in the intermediate layer.

4 Claims, 3 Drawing Sheets

(56) References Cited

U.S. PATENT DOCUMENTS

2003/0205268 A1* 11/2003 Nakamura et al. ........... 136/250
2005/0218467 A1 10/2005 Tomita
2006/0278267 A1* 12/2006 Miyazawa ................... 136/252

FOREIGN PATENT DOCUMENTS

| JP | 2004-171827 A | 6/2004 |
| JP | 2008-115055 A | 5/2008 |
| JP | 2010-009786 A | 1/2010 |

OTHER PUBLICATIONS

Communication dated Jan. 7, 2016, issued by the European Patent Office in corresponding European Application No. 13797130.5.
Ohtani et al., "What is Degussa (Evonik) P25? Crystalline composition analysis, reconstruction from isolated pure particles and photocatalytic activity test", Journal of Photochemistry and Photobiology A: Chemistry 216, 2010, pp. 179-182.
Hore et al., "Influence of scattering layers on efficiency of dye-sensitized solar cells", Solar Energy Materials & Solar Cells 90, 2006, pp. 1176-1188.

* cited by examiner

DYE-SENSITIZED SOLAR CELL

CROSS REFERENCE TO RELATED APPLICATIONS

This application is a Continuation of National Stage of International Application No. PCT/JP2013/055102 filed Feb. 27, 2013, claiming priority based on Japanese Patent Application No. 2012-123033 filed May 30, 2012, the contents of all of which are incorporated herein by reference in their entirety.

TECHNICAL FIELD

The present invention relates to a dye-sensitized solar cell.

BACKGROUND ART

A dye-sensitized solar cell has been developed by Grätzel of Switzerland and his coworker and is the next-generation solar cell attracting attention since it has advantages such as high photoelectric conversion efficiency and a low production cost.

A dye-sensitized solar cell is generally equipped with a working electrode, a counter electrode, a photosensitizing dye supported on an oxide semiconductor layer of the working electrode, and an electrolyte disposed between the working electrode and the counter electrode.

Further improvement of the photoelectric conversion characteristics is required for such a dye-sensitized solar cell, and thus various investigations have been conducted.

For example, a titanium oxide film electrode film structure of a three-electrode structure is disclosed as a titanium oxide film of a dye-sensitized solar cell in Patent Document 1. In this titanium oxide film electrode film structure of a three-electrode structure, a ground layer in contact with a transparent conductive film on a transparent substrate is constituted by an oxide film consisting of anatase-type crystal granular titanium oxide of fine particles having a diameter of from 5 to 10 nm, an intermediate layer provided on the ground layer is constituted by a porous film containing rutile-type crystal needle-shaped titanium oxide having a diameter of from 30 to 200 nm and a length of from 0.5 to 20 µm and anatase-type crystal granular titanium oxide having a diameter of from 5 to 400 nm, and an uppermost layer provided on the intermediate layer is constituted by a titanium oxide film consisting of anatase-type crystal granular titanium oxide having a diameter of from 20 to 400 nm. It has been designed to achieve high photoelectric conversion efficiency in the dye-sensitized solar cell by using a titanium oxide film having such a structure.

CITATION LIST

Patent Document

Patent Document 1: JP 2008-115055 A

SUMMARY OF THE INVENTION

Problem to be Solved by the Invention

However, the dye-sensitized solar cell disclosed in Patent Document 1 described above has the following problem.

In other words, there is a room for advancement in terms of improving the photoelectric conversion characteristics in the dye-sensitized solar cell described in Patent Document 1 above.

The invention has been achieved in view of the above circumstance, and an object thereof is to provide a dye-sensitized solar cell which can improve the photoelectric conversion characteristics.

Means for Solving Problem

In order to solve the above problem, the present inventor has conducted investigation on the titanium oxide film electrode film structure of a three-electrode structure disclosed in Patent Document 1. As a result, in the titanium oxide film electrode film structure of a three-electrode structure, the intermediate layer is constituted by a porous film containing a rutile-type crystal needle-shaped titanium oxide and an anatase-type crystal granular titanium oxide and the uppermost layer is constituted by an anatase-type crystal granular titanium oxide. Here, it is regarded that the reason for that the uppermost layer is constituted by an anatase-type crystal granular titanium oxide is because the effect of light trapping or the like can be obtained by reflecting the transmitted light from the intermediate layer (paragraph 0012). However, the titanium oxide of rutile crystal has a higher refractive index than the titanium oxide of anatase crystal, and thus it exhibits a greater light scattering effect than the titanium oxide of anatase crystal. For this reason, when the content of titanium oxide of rutile crystal in the uppermost layer is smaller than the content of titanium oxide of rutile crystal in the intermediate layer as the titanium oxide film electrode film structure of a three-electrode structure disclosed in Patent Document 1, light is hardly returned to the intermediate layer since the light is more hardly scattered on the uppermost layer even if the light transmitted through the intermediate layer reaches the uppermost layer. For this reason, the light trapping effect is insufficient in the titanium oxide film electrode film structure of a three-electrode structure even if the titanium oxide film electrode film structure of a three-electrode structure disclosed in Patent Document 1 is used. For this reason, the present inventor has considered that there is a limit to achieve high photoelectric conversion efficiency in a dye-sensitized solar cell. Thus, the present inventor has further conducted intensive investigations, and as a result, it has been found that the above problem can be solved by the following invention.

In other words, the invention is a dye-sensitized solar cell which includes a working electrode having a porous titanium oxide layer on a conductive substrate capable of transmitting light, a counter electrode disposed so as to face the working electrode, a photosensitizing dye supported on the porous titanium oxide layer of the working electrode, and an electrolyte disposed between the working electrode and the counter electrode, in which the porous titanium oxide layer includes an anatase crystal-type titanium oxide composed of an anatase crystal and a rutile crystal-type titanium oxide composed of a rutile crystal, and the porous titanium oxide layer includes a laminate consisting of a plurality of layers, an outermost layer disposed at a position farthest from the conductive substrate of the laminate contains the rutile crystal-type titanium oxide, at least one intermediate layer provided between the outermost layer and the conductive substrate in the laminate contains the anatase crystal-type titanium oxide, a first intermediate layer disposed at a position closest to the outermost layer of the at least one intermediate layer contains the anatase crystal-type titanium oxide and the rutile crystal-type titanium oxide, and a content of the rutile crystal-type titanium oxide in the outermost layer is greater than a content of the rutile crystal-type titanium oxide in the intermediate layer.

According to this dye-sensitized solar cell, for example, sunlight is transmitted through the conductive substrate of the working electrode and incident on the porous titanium oxide layer. Thereafter, the light is transmitted through the intermediate layer of the laminate constituting the porous titanium oxide layer and then incident on the outermost layer. At this time, the rutile crystal-type titanium oxide has a higher refractive index than the anatase crystal-type titanium oxide and thus it more easily scatters light than the anatase crystal-type titanium oxide. In addition, the content of the rutile crystal-type titanium oxide in the outermost layer is greater than the content of the rutile crystal-type titanium oxide in the intermediate layer. In other words, the rutile crystal-type titanium oxide which easily scatters light is contained more in the outermost layer than in the intermediate layer. For this reason, it is possible to sufficiently return the light that is transmitted through the intermediate layer and then incident on the outermost layer to the intermediate layer. As a result, the light trapping effect is sufficient in the porous titanium oxide layer. In addition, the photosensitizing dye is more easily adsorbed on the anatase crystal-type titanium oxide than the rutile crystal-type titanium oxide. For this reason, it is possible to allow light to be more sufficiently absorbed by the photosensitizing dye adsorbed on the anatase crystal-type titanium oxide in the intermediate layer than in the outermost layer. In addition, the first intermediate layer of the at least one intermediate layer contains a rutile crystal-type titanium oxide, and thus the light incident on the first intermediate layer is more sufficiently scattered in the first intermediate layer compared to a case in which the first intermediate layer does not contain the rutile crystal-type titanium oxide, and the scattered light is efficiently absorbed by the photosensitizing dye supported on the anatase crystal-type titanium oxide, and thus the efficiency of light absorption more increases. From the above, according to the dye-sensitized solar cell of the invention, it is possible to improve the photoelectric conversion characteristics.

In the dye-sensitized solar cell, it is preferable that the rutile crystal-type titanium oxide be spherical.

In this case, the effect of scattering the light incident on the porous titanium oxide layer more increases compared to a case in which the rutile crystal-type titanium oxide has a shape other than the spherical shape, and thus it is possible to more improve the photoelectric conversion characteristics of the dye-sensitized solar cell.

In the dye-sensitized solar cell, it is preferable that an average particle size of the rutile crystal-type titanium oxide be from 50 to 500 nm in a case in which the rutile crystal-type titanium oxide is spherical.

The light trapping effect in the porous titanium oxide layer is more sufficient when the average particle size of the rutile crystal-type titanium oxide is within the above range compared to the case of being out of the above range, and thus it is possible to more improve the photoelectric conversion characteristics of the dye-sensitized solar cell.

In the dye-sensitized solar cell, it is preferable that a content of the rutile crystal-type titanium oxide in the outermost layer is from 70 to 100% by mass.

In this case, the light trapping effect is more sufficient compared to a case in which the content of the rutile crystal-type titanium oxide in the outermost layer is out of the above range. In addition, the following advantage is also obtained. In other words, the contact area between the outermost layer and the electrolyte is greater than that between the intermediate layer and the electrolyte. For this reason, there is a tendency that the leakage current from the photosensitizing dye into the electrolyte easily increases. With regard to that point, the photosensitizing dye is hardly supported on the rutile crystal-type titanium oxide when the content of the rutile crystal-type titanium oxide in the outermost layer is from 70 to 100% by mass, and thus the photosensitizing dye that functions as a leakage current site more decreases. For this reason, there is a tendency that it is possible to more improve the photoelectric conversion characteristics of the dye-sensitized solar cell compared to a case in which the content of the rutile crystal-type titanium oxide in the outermost layer is out of the above range.

In the dye-sensitized solar cell, it is preferable that a content of the rutile crystal-type titanium oxide in the first intermediate layer of the at least one intermediate layer be from 3 to 15% by mass.

In this case, the absorption of light and trapping of light are performed with good balance compared to a case in which the content of the rutile crystal-type titanium oxide in the intermediate layer is out of the above range, and thus it is possible to more improve the photoelectric conversion characteristics of the dye-sensitized solar cell.

In the dye-sensitized solar cell, it is preferable that a content of the rutile crystal-type titanium oxide in the entire porous titanium oxide layer be from 5 to 50% by mass.

It is possible to more improve the photoelectric conversion characteristics of the dye-sensitized solar cell when the content of the rutile crystal-type titanium oxide in the entire porous titanium oxide layer is from 5 to 50% by mass compared to the case of being out of the above range.

Meanwhile, in the invention, the "laminate" is constituted by a plurality of layers, but whether or not the laminate has a plurality of layers is determined by whether or not the adjacent two layers meet the following requirement i) or ii).

i) The average particle size of the titanium oxide in the two layers is different ii) The content of the rutile crystal-type titanium oxide in the two layers is different In addition, the average particle size of the rutile crystal-type titanium oxide refers to the average particle size measured by an X-ray diffraction apparatus (XRD, Smart-Lab, a fully automatic horizontal multi-purpose X-ray diffractometer manufactured by Rigaku Corporation) in a case in which the average particle size is from 1 to 100 nm, and it refers to the average particle size measured by a scanning electron microscope (SEM) in a case in which the average particle size exceeds 100 nm. Here, the average particle size measured by an SEM refers to the average value of the particle sizes calculated for the rutile crystal-type titanium oxide observed by an SEM based on the following Equation.

$$\text{Particle size} = (S/\pi)^{1/2}$$

(In Equation above, S represents the area of the rutile crystal-type titanium oxide)

Moreover, the term "spherical shape" refers to the shape in which the ratio of the maximum diameter to the minimum diameter of the rutile crystal-type titanium oxide is 1 or more and 1.75 or less in the case of observing the porous titanium oxide layer by an SEM.

Effect of the Invention

According to the invention, a dye-sensitized solar cell which can improve the photoelectric conversion characteristic is provided.

MODE(S) FOR CARRYING OUT THE INVENTION

Hereinafter, embodiments of the invention will be described in detail with reference to the accompanying drawings. Meanwhile, the same reference numerals are given to the same or equivalent components in all of the figures, and redundant description is omitted.

Figure 1:
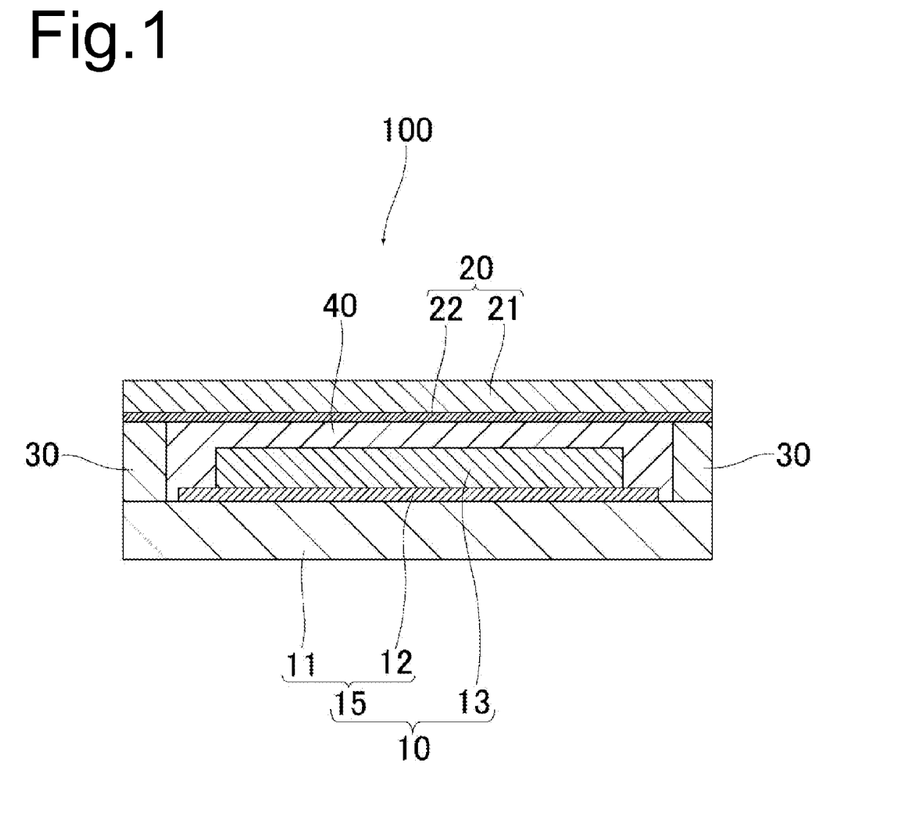
FIG. 1 is a cross-sectional view illustrating an embodiment of a dye-sensitized solar cell of the invention.
Figure 2:
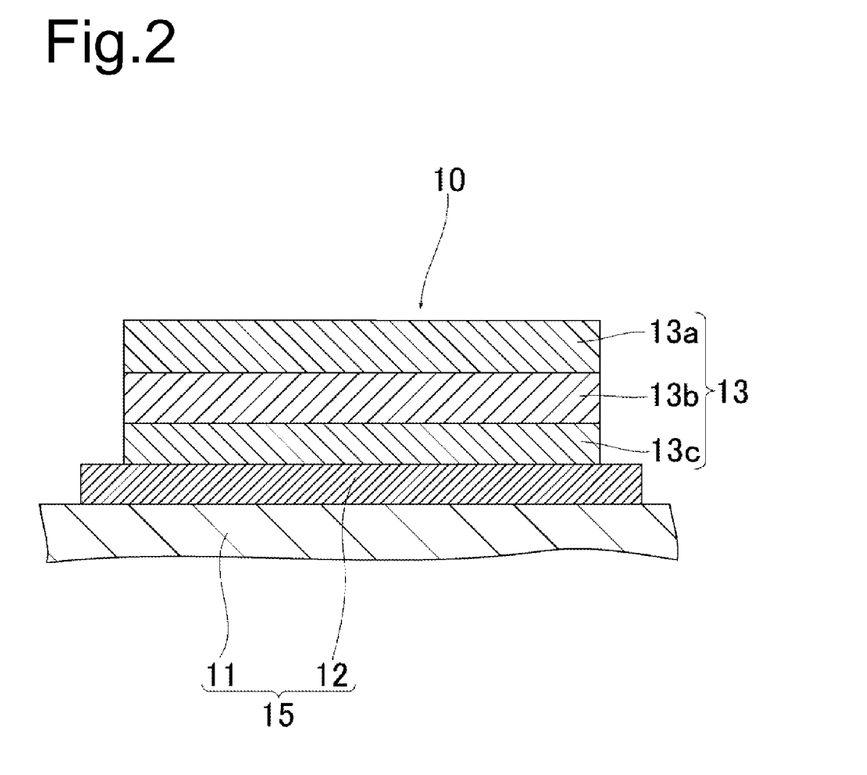
FIG. 2 is a partially enlarged cross-sectional view illustrating a working electrode in FIG. 1.

FIG. 1 is a cross-sectional view illustrating a preferred embodiment of a dye-sensitized solar cell of the invention, and FIG. 2 is a partially enlarged cross-sectional view illustrating a working electrode in FIG. 1.

As illustrated in FIG. 1, a dye-sensitized solar cell 100 is equipped with a working electrode 10 having a porous titanium oxide layer 13 containing titanium oxide, a counter electrode 20 disposed so as to face the working electrode 10, a photosensitizing dye supported on the porous titanium oxide layer 13 of the working electrode 10, a sealing portion 30 connecting the working electrode 10 and the counter electrode 20, and an electrolyte 40 disposed between the working electrode 10 and the counter electrode 20.

The working electrode 10 has the porous titanium oxide layer 13 on a conductive substrate 15 capable of transmitting light. The conductive substrate 15 has a transparent substrate 11 and a transparent conductive film 12 which is provided on the side of the transparent substrate 11 facing the counter electrode 20. The electrolyte 40 is impregnated also into the porous titanium oxide layer 13. The counter electrode 20 is equipped with a counter electrode substrate 21 and a conductive catalyst layer 22 which is provided on the side of the counter electrode substrate 21 facing the working electrode 10 and which promotes the reduction reaction on the surface of the counter electrode 20.

As illustrated in FIG. 2, the porous titanium oxide layer 13 is constituted by a three-layer laminate. The porous titanium oxide layer 13 is constituted by an outermost layer 13a which is disposed at the position farthest from the conductive substrate 15 and intermediate layers 13b and 13c which are disposed between the outermost layer 13a and the conductive substrate 15. The intermediate layer 13b is adjacent to the conductive substrate 15 side with respect to the outermost layer 13a. In other words, the intermediate layer 13b between the intermediate layers 13b and 13c is disposed at the position closest to the outermost layer 13a as a first intermediate layer. The intermediate layer 13c is adjacent to the conductive substrate 15 side with respect to the intermediate layer 13b. Here, the outermost layer 13a functions as a light reflecting layer to reflect light and the intermediate layers 13b and 13c function as a light absorbing layer to allow light to be absorbed by the photosensitizing dye. In other words, the photosensitizing dye is supported on the intermediate layers 13b and 13c but the photosensitizing dye is almost not supported on the outermost layer 13a.

The porous titanium oxide layer 13 is constituted by titanium oxide. The titanium oxide is constituted by an anatase crystal-type titanium oxide composed of an anatase-form crystal and a rutile crystal-type titanium oxide composed of a rutile form crystal. The outermost layer 13a contains the rutile crystal-type titanium oxide and the intermediate layers 13b and 13c contain the anatase crystal-type titanium oxide. Particularly the intermediate layer 13b contains not only the anatase crystal-type titanium oxide but also the rutile crystal-type titanium oxide.

In addition, the content of the rutile crystal-type titanium oxide in the outermost layer 13a is greater than the content of the rutile crystal-type titanium oxide in the intermediate layer 13b, and the content of the rutile crystal-type titanium oxide in the intermediate layer 13b is greater than the content of the rutile crystal-type titanium oxide in the intermediate layer 13c. That is to say, in the porous titanium oxide layer 13, the content of the rutile crystal-type titanium oxide in the layer increases as the distance from the conductive substrate 15 increases. On the contrary, the content of the anatase crystal-type titanium oxide in the layer decreases as the distance from the conductive substrate 15 increases.

According to the dye-sensitized solar cell 100 described above, for example, the light is transmitted through the conductive substrate 15 and incident on the porous titanium oxide layer 13 when sunlight is incident on the conductive substrate 15 of the working electrode 10. Thereafter, the light is absorbed by the intermediate layer 13c and the intermediate layer 13b of the porous titanium oxide layer 13, and the residual light is incident on the outermost layer 13a. At this time, the rutile crystal-type titanium oxide has a higher refractive index than the anatase crystal-type titanium oxide, and thus it scatters light more easily than the anatase crystal-type titanium oxide. In addition, the content of the rutile crystal-type titanium oxide in the outermost layer 13a is greater than the content of the rutile crystal-type titanium oxide in the intermediate layers 13b and 13c. In other words, the rutile crystal-type titanium oxide which easily scatters light is more contained in the outermost layer 13a than in the intermediate layers 13b and 13c. For this reason, it is possible to sufficiently return the light that is transmitted through the intermediate layers 13b and 13c and then incident on the outermost layer 13a to the intermediate layers 13b and 13c. As a result, the light trapping effect is sufficient in the porous titanium oxide layer 13. Moreover, the photosensitizing dye is more easily adsorbed on the anatase crystal-type titanium oxide than the rutile crystal-type titanium oxide. For this reason, it is possible to allow light to be more sufficiently absorbed by the photosensitizing dye adsorbed on the anatase crystal-type titanium oxide in the intermediate layers 13b and 13c than in the outermost layer 13a. Furthermore, at least the intermediate layer 13b between the intermediate layers 13b and 13c contains the rutile crystal-type titanium oxide, and thus the light incident on the intermediate layer 13b is more sufficiently scattered in the intermediate layer 13b, the scattered light is efficiently absorbed by the photosensitizing dye supported on the anatase crystal-type titanium oxide compared to a case in which the intermediate layer 13b does not contain the rutile crystal-type titanium oxide, and as a result, the efficiency of light absorption more increases. From the above, according to the dye-sensitized solar cell 100, it is possible to improve the photoelectric conversion characteristics.

Next, the working electrode 10, the photosensitizing dye, the counter electrode 20, the sealing portion 30, and the electrolyte 40 will be described in detail.

(Working Electrode)

As described above, the working electrode 10 is equipped with the conductive substrate 15 capable of transmitting light and the porous titanium oxide layer 13 provided on the conductive substrate 15. The conductive substrate 15 has the transparent substrate 11 and the transparent conductive film 12 which is provided on the side of the transparent substrate 11 facing the counter electrode 20 (see FIG. 1).

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the dye-sensitized solar cell 100 and is not particularly limited, but it may be set in the range of from 50 to 10000 μm, for example.

Examples of the material constituting the transparent conductive film 12 include a conductive metal oxide such as tin-doped indium oxide (ITO), tin oxide ($SnO_2$), and fluorine-doped tin oxide (FTO). Among them, it is preferable that the transparent conductive film 12 be constituted by FTO since FTO has high heat resistance and chemical resistance. The thickness of the transparent conductive film 12 may be set in the range of from 0.01 to 2 μm, for example.

The shape of the titanium oxide contained in the porous titanium oxide layer 13 is not particularly limited, and examples thereof may include a spherical shape and a needle shape. It is preferable that particularly the rutile crystal-type titanium oxide is spherical. In this case, the effect of scattering the light incident on the porous titanium oxide layer 13 more increases compared to a case in which the rutile crystal-type titanium oxide has a shape other than the spherical shape, and thus it is possible to more improve the photoelectric conversion characteristics of the dye-sensitized solar cell 100.

The average particle size of the rutile crystal-type titanium oxide is usually from 40 to 700 nm but preferably from 50 to 500 nm in a case in which the rutile crystal-type titanium oxide is spherical. The light trapping effect in the porous titanium oxide layer 13 is more sufficient when the average particle size of the rutile crystal-type titanium oxide is within the range of from 50 to 500 nm compared to the case of being out of this range, and thus it is possible to more improve the photoelectric conversion characteristics of the dye-sensitized solar cell 100. The average particle size of the rutile crystal-type titanium oxide is more preferably from 80 to 400 nm and particularly preferably from 100 to 300 nm.

The content of the rutile crystal-type titanium oxide in the outermost layer 13a is not particularly limited but is preferably from 70 to 100% by mass. In this case, the light trapping effect is more sufficient compared to a case in which the content of the rutile crystal-type titanium oxide in the outermost layer 13a is out of the above range. In addition, the following advantage is also obtained. In other words, first, the contact area of the outermost layer 13a with the electrolyte 40 is greater compared to those of the intermediate layers 13b and 13c with the electrolyte 40. For this reason, there is a tendency that the leakage current from the photosensitizing dye into the electrolyte 40 easily increases. With regard to that point, the photosensitizing dye is almost not supported on the rutile crystal-type titanium oxide when the content of the rutile crystal-type titanium oxide in the outermost layer 13a is from 70 to 100% by mass, and thus the photosensitizing dye that functions as a leakage current site more decreases. For this reason, there is a tendency that the photoelectric conversion characteristics of the dye-sensitized solar cell 100 can be more improved compared to a case in which the content of the rutile crystal-type titanium oxide in the outermost layer 13a is out of the above range. Meanwhile, the rest of the titanium oxide contained in the outermost layer 13a is the anatase crystal-type titanium oxide in a case in which the content of the rutile crystal-type titanium oxide in the outermost layer 13a is less than 100% by mass.

The content of the rutile crystal-type titanium oxide in the outermost layer 13a is more preferably from 85 to 100% by mass and particularly preferably 100% by mass.

The intermediate layer 13b is constituted by the anatase crystal-type titanium oxide and the rutile crystal-type titanium oxide.

Here, the anatase crystal-type titanium oxide may be constituted by only an anatase crystal-type titanium oxide for light absorption to allow light to be absorbed by the photosensitizing dye or may be constituted by an anatase crystal-type titanium oxide for light absorption and an anatase crystal-type titanium oxide for light scatter to scatter light. However, it is preferable that the anatase crystal-type titanium oxide be constituted by only an anatase crystal-type titanium oxide for light absorption. In this case, it is possible to more improve the photoelectric conversion characteristics of the dye-sensitized solar cell 100.

The content of the rutile crystal-type titanium oxide in the intermediate layer 13b is not particularly limited but is preferably from 3 to 15% by mass. In this case, the absorption of light and trapping of light are performed with good balance compared to a case in which the content of the rutile crystal-type titanium oxide in the intermediate layer 13b is out of the above range, and thus it is possible to more improve the photoelectric conversion characteristics of the dye-sensitized solar cell 100.

The content of the rutile crystal-type titanium oxide in the intermediate layer 13b is more preferably from 3 to 10% by mass.

The content difference between the content of the rutile crystal-type titanium oxide in the intermediate layer 13b and the content of the rutile crystal-type titanium oxide in the outermost layer 13a may be greater than 0% by mass but is preferably 70% by mass or more and less than 100% by mass. In this case, the following advantage is obtained compared to a case in which the above content difference is out of the above range. In other words, it is possible to improve the light absorption efficiency since the light trapping effect more increases. In addition, the content of the anatase crystal-type titanium oxide in the intermediate layer 13b is greater than the content of the anatase crystal-type titanium oxide in the outermost layer 13a. In other words, it is possible to more increase the specific surface area of the anatase crystal-type titanium oxide that easily supports the photosensitizer dye. For this reason, it is possible to more improve the photoelectric conversion characteristics of the dye-sensitized solar cell 100.

The intermediate layer 13c may contain the anatase crystal-type titanium oxide. Hence, the intermediate layer 13c may be constituted by only the anatase crystal-type titanium oxide or may be constituted by the anatase crystal-type titanium oxide and the rutile crystal-type titanium oxide.

The content of the rutile crystal-type titanium oxide in the intermediate layer 13c may be smaller than the content of the rutile crystal-type titanium oxide in the intermediate layer 13b.

The content difference between the content of the rutile crystal-type titanium oxide in the intermediate layer 13c and the content of the rutile crystal-type titanium oxide in the intermediate layer 13b is not particularly limited but is preferably greater than 0% by mass and 10% by mass or less. In this case, higher power generation characteristics are obtained compared a case in which the content difference is out of the above range.

It is preferable that the intermediate layer 13c does not contain the rutile crystal-type titanium oxide. In other words, it is preferable that the content of the rutile crystal-type titanium oxide in the intermediate layer 13c is 0% by mass. In this case, it is possible to allow light to be more sufficiently absorbed in the porous titanium oxide layer 13 compared to a case in which the intermediate layer 13c contains the rutile crystal-type titanium oxide, and thus it is possible to more improve the photoelectric conversion characteristics of the dye-sensitized solar cell 100.

The anatase crystal-type titanium oxide in the intermediate layer 13c may be constituted by only an anatase crystal-type titanium oxide for light absorption or may be constituted by an anatase crystal-type titanium oxide for light absorption and an anatase crystal-type titanium oxide for light scatter in the same manner as the intermediate layer 13b. However, it is preferable that the anatase crystal-type titanium oxide is constituted by only the anatase crystal-type titanium oxide for light absorption. In this case, it is possible to more improve the photoelectric conversion characteristics of the dye-sensitized solar cell 100.

The content of the rutile crystal-type titanium oxide in the entire porous titanium oxide layer 13 is not particularly limited but is preferably from 5 to 50% by mass and more preferably 20 to 40% by mass.

It is possible to more improve the photoelectric conversion characteristics of the dye-sensitized solar cell 100 when the content of the rutile crystal-type titanium oxide in the entire porous titanium oxide layer 13 is from 5 to 50% by mass compared to the case of being out of the above range.

The thickness of the porous titanium oxide layer 13 is not particularly limited and may be set to from 0.5 to 50 μm, for example. The thickness of the outermost layer 13a is not particularly limited and is usually from 1 to 20 μm but preferably from 2 to 10 μm. The thickness of the intermediate layer 13b is also not particularly limited and is usually from 1 to 40 μm but preferably from 3 to 25 μm. The thickness of the intermediate layer 13c is also not particularly limited and is usually from 1 to 40 μm but preferably from 3 to 25 μm.

(Photosensitizing Dye)

Examples of the photosensitizing dye include a ruthenium complex having a ligand containing a bipyridine structure or a terpyridine structure, or an organic dye such as porphyrin, eosin, rhodamine, and merocyanine. Among them, a ruthenium complex having a ligand containing a terpyridine structure is preferable. In this case, it is possible to more improve the photoelectric conversion characteristics of the dye-sensitized solar cell 100.

Meanwhile, it is preferable to use a ruthenium complex having a ligand containing a bipyridine structure as the photosensitizing dye in a case in which the dye-sensitized solar cell 100 is used indoor or in an environment having a low illumination intensity (10 to 10000 lux).

(Counter Electrode)

As described above, the counter electrode 20 is equipped with the counter electrode substrate 21 and the conductive catalyst film (conductive film) 10 which is provided on the side of the counter electrode substrate 21 facing the working electrode 10 and which promotes the reduction reaction on the surface of the counter electrode 20.

The counter electrode substrate 21 is constituted by, for example, a corrosion-resistant metallic material such as titanium, nickel, platinum, molybdenum, tungsten, and SUS or a substance obtained by forming a film composed of a conductive oxide such as ITO and FTO on the transparent substrate 11 described above. The thickness of the counter electrode substrate 21 is appropriately determined depending on the size of the dye-sensitized solar cell 100 and is not particularly limited, but the thickness may be set to from 0.005 to 0.1 mm, for example.

The catalyst layer 22 is constituted by platinum, a carbon-based material, a conductive polymer or the like. Here, examples of the carbon-based material include carbon black, ketjen black, and carbon nanotubes, and carbon nanotubes are particularly suitably used among them.

(Sealing Portion)

Examples of the material constituting the sealing portion 30 include an inorganic insulating material such as a non-lead-based transparent glass frit having a low melting point or a resin such as various kinds of modified polyolefin resins including an ionomer, an ethylene-vinyl acetic anhydride copolymer, an ethylene-methacrylic acid copolymer, an ethylene-vinyl alcohol copolymer and the like, an ultraviolet curable resin, and vinyl alcohol polymer. Meanwhile, the sealing portion 30 may be constituted by only a resin or may be constituted by a resin and an inorganic filler.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above and the organic solvent above instead of the organic solvent above.

In addition, it is possible to add an additive to the electrolyte 40. Examples of the additive include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte of a quasi-solid electrolyte which is obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Next, the method of manufacturing the dye-sensitized solar cell 100 will be described.

<Working Electrode Preparing Process>

First, the working electrode 10 is prepared in the following manner.

At the beginning, the transparent conductive film 12 is formed on the transparent substrate 11, and thus the conductive substrate 15 exhibiting transparency is prepared. As the method of forming the transparent conductive film 12, a sputtering method, a vapor deposition method, a spray pyrolysis deposition method (SPD), a CVD method or the like is used.

(Porous Titanium Oxide Layer Forming Process)

Next, a first paste for forming the intermediate layer 13c is printed on the transparent conductive film 12. The first paste contains a resin such as polyethylene glycol and ethylcellulose and a solvent such as terpineol in addition to titanium oxide. The titanium oxide contains the anatase crystal-type titanium oxide and contains the rutile crystal-type titanium oxide if necessary. The content of the rutile crystal-type titanium oxide in the entire titanium oxide contained in the first paste is set to be the same as the content of the rutile crystal-type titanium oxide in the intermediate layer 13c.

Next, the above first paste is dried, and a second paste for forming the intermediate layer 13b is printed thereon. The second paste contains a resin such as polyethylene glycol and ethylcellulose and a solvent such as terpineol in addition to titanium oxide. The titanium oxide contained in the second paste contains the anatase crystal-type titanium oxide and the rutile crystal-type titanium oxide. The content of the rutile crystal-type titanium oxide in the entire titanium oxide contained in the second paste is set to be the same as the content of the rutile crystal-type titanium oxide in the intermediate layer 13b. In other words, the content of the rutile crystal-type titanium oxide in the entire titanium oxide contained in the second paste is set to be greater than the content of the rutile crystal-type titanium oxide in the titanium oxide contained in the first paste.

Next, the above second paste is dried, and an outermost layer forming paste is printed thereon. The outermost layer forming paste contains a resin such as polyethylene glycol and ethylcellulose and a solvent such as terpineol in addition to titanium oxide. The titanium oxide contained in the outermost layer forming paste contains a rutile crystal-type titanium oxide and contains an anatase crystal-type titanium oxide if necessary. The content of the rutile crystal-type titanium oxide in the entire titanium oxide is set to be the same as the content of the rutile crystal-type titanium oxide in the outermost layer 13a. In other words, the content of the rutile crystal-type titanium oxide in the entire titanium oxide contained in the outermost layer forming paste is set to be greater than the content of the rutile crystal-type titanium oxide in the titanium oxide contained in the second paste.

As the printing method of the first paste, the second paste, and the outermost layer forming paste, it is possible to use, for example, a screen printing method, a doctor blade method, or a bar coating method.

Finally, the first paste, the second paste, and the outermost layer forming paste are collectively fired to form the porous titanium oxide layer 13 on the transparent conductive film 12. The firing temperature varies depending on the material of the oxide semiconductor particles but is usually from 350 to 600° C., and the firing time also varies depending on the material of the oxide semiconductor particles but is usually from 1 to 5 hours. Meanwhile, it is also possible that the second paste is printed after firing the first paste, the outermost layer forming paste is printed after firing the second paste, and finally the outermost layer forming paste is fired instead of firing the first paste, the second paste, and the outermost layer forming paste collectively.

The working electrode 10 is obtained in this manner.

<Dye Supporting Process>

Next, a photosensitizing dye is supported on the porous titanium oxide layer 13 of the working electrode 10. For this, a photosensitizing dye may be adsorbed on the porous titanium oxide layer 13 by immersing the working electrode 10 in a solution containing the photosensitizing dye to allow the photosensitizing dye to be supported on the porous titanium oxide layer 13, the extra photosensitizing dye is then washed out with the solvent component of the above solution, and drying is performed, and thus the photosensitizing dye may be adsorbed on the porous titanium oxide layer 13. However, it is also possible to support the photosensitizing dye on the porous titanium oxide layer 13 by coating a solution containing the photosensitizer dye on the porous titanium oxide layer 13 and then drying to adsorb the photosensitizing dye on the porous titanium oxide layer 13.

<Counter Substrate Preparing Process>

On the other hand, the counter electrode 20 is prepared in the following manner.

First, the counter electrode substrate 21 is prepared. The catalyst layer 22 is then formed on the counter electrode substrate 21. A sputtering method, a screen printing method, a vapor deposition method or the like is used as the method of forming the catalyst layer 22. The sputtering method is preferable in terms of the uniformity of the film among these.

<Resin Sheet Fixing Process>

Next, for example, an annular sheet formed of a thermoplastic resin is prepared. This sheet is then, placed on the working electrode 10 having the porous titanium oxide layer 13 which supports the photosensitizing dye and heated to melt. At this time, the porous titanium oxide layer 13 is disposed on the inner side of the annular sheet. The annular resin sheet is fixed on the surface of the working electrode 10 in this manner.

<Electrolyte Disposing Process>

Thereafter, the electrolyte 40 is prepared. The electrolyte 40 is then placed on the inner side of the annular resin sheet fixed on the working electrode 10. It is possible to dispose the electrolyte 40, for example, by a printing method such as screen printing.

<Sealing Process>

After the electrolyte 40 is disposed on the working electrode 10, the counter electrode 20 is superimposed on the working electrode 10 so as to sandwich the electrolyte 40 between the counter electrode 20 and the working electrode 10, and an annular resin sheet is melted by heating to adhere the counter electrode 20 to the working electrode 10. The dye-sensitized solar cell 100 having the sealing portion 30 between the working electrode 10 and the counter electrode 20 is obtained in this manner, and thus the manufacture of the dye-sensitized solar cell 100 is completed.

The above manufacturing method also has an advantage that the degradation of the photosensitizer dye can be sufficiently suppressed even if the porous titanium oxide layer 13 constituting the working electrode 10 is in a state of being exposed to light during the time after the working electrode 10 is obtained until the working electrode 10 is bonded with the counter electrode 20. In other words, the photosensitizing dye supported on the porous titanium oxide layer is generally degraded by the ultraviolet rays contained in the light when the porous titanium oxide layer 13 is exposed to light, and thus the photoelectric conversion characteristics of the dye-sensitized solar cell 100 tends to be deteriorated. With regard to that point, in the above manufacturing method, the content of the rutile crystal-type titanium oxide in the outermost layer 13a is greater than the content of the rutile crystal-type titanium oxide in the intermediate layer 13b. Here, the photosensitizing dye is almost not supported on the rutile crystal-type titanium oxide. In addition, the rutile crystal-type titanium oxide easily scatters light. For this reason, light is sufficiently scattered by the rutile crystal-type titanium oxide in the outermost layer 13a and thus it is sufficiently suppressed that the ultraviolet rays contained in the light are incident on the intermediate layer 13b even if the porous titanium oxide layer 13 constituting the working electrode 10 is exposed to the light and the light is incident on the porous titanium oxide layer 13 from the outermost layer 13a side during the time after the working electrode 10 is obtained until the working electrode 10 is bonded with the counter electrode 20. For this reason, it is sufficiently suppressed that the photosensitizing dye supported on the anatase crystal-type titanium oxide in the intermediate layer 13b is degraded by the ultraviolet rays contained in the light. Hence, it is sufficiently suppressed that the photoelectric conversion characteristics of the dye-sensitized solar cell 100 are deteriorated by the above manufacturing method.

Meanwhile, the preparation of the counter electrode 20 may be performed before bonding of the counter electrode 20 with the working electrode 10. Hence, the preparation of the counter electrode 20 may be performed after the electrolyte 40 is disposed on the working electrode 10 and before the counter electrode 20 is bonded with the working electrode 10 in a case in which the electrolyte 40 is disposed on the working electrode 10. However, the preparation of the working electrode 10 may be performed after the electrolyte 40 is disposed on the counter electrode 20 and before the counter electrode 20 is bonded with the working electrode 10 in a case in which the electrolyte 40 is disposed on the counter electrode 20.

The invention is not limited to the above embodiment. For example, in the above embodiment, the content of rutile crystal-type titanium oxide in the intermediate layer 13b is greater than the content of the rutile crystal-type titanium oxide in the intermediate layer 13c but the content of rutile crystal-type titanium oxide in the intermediate layer 13b may be the same as the content of the rutile crystal-type titanium oxide in the intermediate layer 13c.

Figure 3:
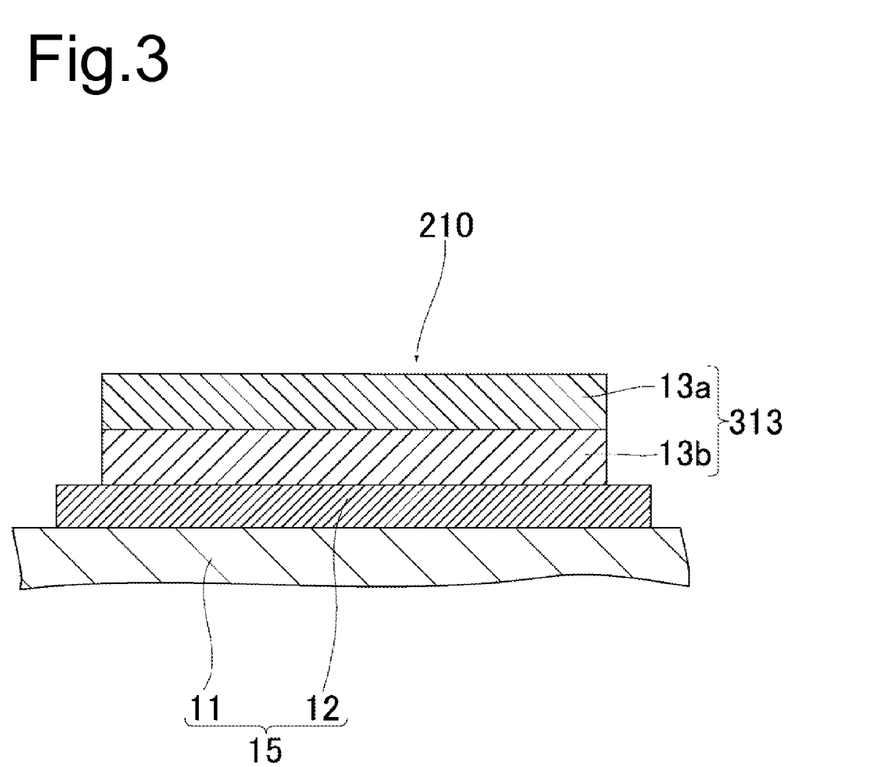
FIG. 3 is a partially enlarged cross-sectional view illustrating a modified example of a working electrode in FIG. 1.

In addition, in the above embodiment, the porous titanium oxide layer 13 has the intermediate layer 13c but a porous titanium oxide layer 313 may not have the intermediate layer 13c as a working electrode 210 illustrated in FIG. 3. In other words, the porous titanium oxide layer 313 may be constituted by the outermost layer 13a and the intermediate layer 13b.

EXAMPLES

Hereinafter, the content of the invention will be described more specifically with reference to Examples, but the invention is not limited to the following Examples.

Example 1

Fabrication of Working Electrode

First, an FTO/glass substrate prepared by forming an FTO film on a glass substrate was prepared. This FTO/glass substrate was then washed, this substrate was subjected to the UV-$O_3$ treatment, and a titanium oxide nanoparticle paste for intermediate layer formation containing titanium oxide was coated on the substrate by screen printing and dried at 150° C. for 10 minutes. At this time, the titanium oxide was constituted by an anatase crystal-type titanium oxide for light absorption (21NR manufactured by JGC Catalysts and Chemicals Ltd.) and a rutile crystal-type titanium oxide for light scatter (titanium oxide (rutile form) manufactured by Junsei Chemical Co., Ltd.). Here, the content of the rutile crystal-type titanium oxide in the titanium oxide was set to be 5% by mass.

Next, a titanium oxide nanoparticle paste for outermost layer formation was prepared in the same manner as the titanium oxide nanoparticle paste for intermediate layer formation except that titanium oxide composed of only the rutile crystal-type titanium oxide for light scatter having an average particle size of 180 nm was used as titanium oxide. Thereafter, the titanium oxide nanoparticle paste for outermost layer formation was coated on the dried titanium oxide nanoparticle paste for intermediate layer formation by screen printing and dried at 150° C. for 10 hours.

In this manner, an unfired substrate was obtained. Thereafter, this unfired substrate was introduced into an oven and the titanium oxide nanoparticle paste for intermediate layer formation and the titanium oxide nanoparticle paste for outermost layer formation were fired at 500° C. for 1 hour so as to form a porous titanium oxide layer which had a thickness of 14 mm and was constituted by a laminate formed by sequentially laminating an intermediate layer having a thickness of 10 mm and a outermost layer having a thickness of 4 μm on an FTO film, thereby obtaining the working electrode. Meanwhile, the working electrode fabricated in the same manner as the above was cut, and the cross-sections of the intermediate layer and the outermost layer of the cross-section of the working electrode were observed by an SEM, and as a result, the shape of the titanium oxide in the outermost layer was spherical and the average particle size thereof was 180 nm. In addition, the shape of any of the titanium oxides in the intermediate layer was spherical, and among the titanium oxides, the particle size of the titanium oxide having a smaller particle size was from 20 to 25 nm and the particle size of the titanium oxide having a greater particle size was from 150 to 210 nm. At this time, the XRD analysis of the titanium oxides in the outermost layer and the intermediate layer was performed, and as a result, it was found that the titanium oxide in the outermost layer was a rutile crystal-type titanium oxide. In addition, in the intermediate layer, the titanium oxide having a smaller particle size was an anatase crystal-type titanium oxide and the titanium oxide having a greater particle size was a rutile crystal-type titanium oxide. Moreover, it was found that the content of the rutile crystal-type titanium oxide in the outermost layer was 100% by mass, the content of the rutile crystal-type titanium oxide in the intermediate layer was 5% by mass, and the content of the rutile crystal-type titanium oxide in the entire porous titanium oxide layer was 32% by mass.

(Supporting of Photosensitizing Dye)

Next, N719 dye that is a photosensitizing dye was dissolved in a mixed solvent prepared by mixing acetonitrile and t-butyl alcohol at 1:1 (volume ratio) to prepare a dye solution. Thereafter, the above working electrode was immersed in this dye solution for 24 hours, and thus the photosensitizing dye on the porous titanium oxide layer was supported.

(Fabrication of Counter Electrode)

Meanwhile, an FTO/glass substrate which had a thickness of 1 mm and was used in the fabrication of the working electrode was prepared, and Pt was deposited on this substrate by a sputtering method. The counter electrode was obtained in this manner.

(Fabrication of Sealing Portion)

Next, an annular thermoplastic resin sheet consisting of Himilan (trade name, manufactured by Du Pont-Mitsui Polychemicals Co., Ltd.) that is an ionomer was disposed on the working electrode. At this time, the porous titanium oxide layer was disposed on the inner side of the annular thermoplastic resin sheet. The thermoplastic resin sheet was then melted by heating at 180° C. for 5 minutes and adhered to the working electrode. Thus, the sealing portion was fixed to the working electrode.

(Disposition of Electrolyte)

On the other hand, an electrolyte obtained by adding $I_2$, guanidinium thiocyanate, and 1-methylbenzimidazole to a mixture of 1-hexyl-3-methylimidazolium iodide and 3-methoxypropionitrile was prepared. Thereafter, the electrolyte thus prepared was coated on the working electrode by a screen printing method so as to cover the porous titanium oxide layer.

(Sealing)

The counter electrode was superimposed on the working electrode, to which the sealing portion was fixed, so as to sandwich the electrolyte between the working electrode and the counter electrode, and the sealing portion was melted by heating under reduced pressure (1000 Pa) so as to adhere the counter electrode to the sealing portion. The dye-sensitized solar cell was obtained in this manner.

Example 2

The dye-sensitized solar cell was fabricated in the same manner as in Example 1 except that the titanium oxide composed of a rutile crystal-type titanium oxide having an average particle size of 550 nm was used as the titanium oxide for light scatter in the titanium oxide nanoparticle paste for outermost layer formation instead of the titanium oxide composed of only a rutile crystal-type titanium oxide having an average particle size of 180 nm as presented in Table 1.

Example 3

The dye-sensitized solar cell was fabricated in the same manner as in Example 1 except that the titanium oxide composed of a rutile crystal-type titanium oxide having an average particle size of 180 nm and an anatase crystal-type titanium oxide having an average particle size of 180 nm was used as the titanium oxide for light scatter in the titanium oxide nanoparticle paste for outermost layer formation instead of the titanium oxide composed of only a rutile crystal-type titanium oxide having an average particle size of 180 nm, the content of the rutile crystal-type titanium oxide occupied in the entire titanium oxide of the outermost layer was changed to 80% by mass, and also the content of rutile crystal-type titanium oxide in the entire porous titanium oxide layer was changed from 32% by mass to 26% by mass as presented in Table 1.

Example 4

The dye-sensitized solar cell was fabricated in the same manner as in Example 1 except that the titanium oxide composed of a rutile crystal-type titanium oxide having an average particle size of 180 nm (diameter: 150 to 210 nm) and an anatase crystal-type titanium oxide having an average particle size of 180 nm (diameter: 150 to 210 nm) was used as the titanium oxide in the titanium oxide nanoparticle paste for outermost layer formation instead of the titanium oxide composed of only a rutile crystal-type titanium oxide having an average particle size of 180 nm, the content of the rutile crystal-type titanium oxide occupied in the entire titanium oxide of the outermost layer was changed to 60% by mass, and also the content of rutile crystal-type titanium oxide in the entire porous titanium oxide layer was changed from 32% by mass to 21% by mass as presented in Table 1.

Example 5

The dye-sensitized solar cell was fabricated in the same manner as in Example 1 except that the content of rutile crystal-type titanium oxide that is titanium oxide for light scatter in the intermediate layer was changed from 5% by mass to 15% by mass, and the content of rutile crystal-type titanium oxide in the entire porous titanium oxide layer was changed from 32% by mass to 40% by mass as presented in Table 1.

Example 6

The dye-sensitized solar cell was fabricated in the same manner as in Example 1 except that the titanium oxide composed of a rutile crystal-type titanium oxide having an average particle size of 40 nm was used as the titanium oxide for light scatter in the titanium oxide nanoparticle paste for outermost layer formation instead of the titanium oxide composed of only a rutile crystal-type titanium oxide having an average particle size of 180 nm as presented in Table 1.

Example 7

The dye-sensitized solar cell was fabricated in the same manner as in Example 1 except that the titanium oxide composed of a rutile crystal-type titanium oxide having an average particle size of 100 nm was used as the titanium oxide for light scatter in the titanium oxide nanoparticle paste for outermost layer formation instead of the titanium oxide composed of only a rutile crystal-type titanium oxide having an average particle size of 180 nm as presented in Table 1.

Example 8

The dye-sensitized solar cell was fabricated in the same manner as in Example 1 except that the content of rutile crystal-type titanium oxide that is titanium oxide for light scatter in the intermediate layer was changed from 5% by mass to 3% by mass, and the content of rutile crystal-type titanium oxide in the entire porous titanium oxide layer was changed from 32% by mass to 31% by mass as presented in Table 1.

Comparative Example 1

The dye-sensitized solar cell was fabricated in the same manner as in Example 1 except that the content of rutile crystal-type titanium oxide that is titanium oxide for light scatter in the intermediate layer was changed from 5% by mass to 0% by mass, the outermost layer was not formed on the intermediate layer, and the content of rutile crystal-type titanium oxide in the entire porous titanium oxide layer was changed from 32% by mass to 0% by mass as presented in Table 1.

Comparative Example 2

The dye-sensitized solar cell was fabricated in the same manner as in Example 1 except that the content of rutile crystal-type titanium oxide that is titanium oxide for light scatter in the intermediate layer was changed from 5% by mass to 0% by mass, the titanium oxide for light scatter in the outermost layer was changed from the rutile crystal-type titanium oxide to the anatase crystal-type titanium oxide, and the content of rutile crystal-type titanium oxide in the entire porous titanium oxide layer was changed from 32% by mass to 0% by mass as presented in Table 1.

Comparative Example 3

The dye-sensitized solar cell was fabricated in the same manner as in Example 1 except that the titanium oxide for light scatter in the intermediate layer was changed from the rutile crystal-type titanium oxide to the anatase crystal-type titanium oxide, and the content of rutile crystal-type titanium oxide in the entire porous titanium oxide layer was changed from 32% by mass to 0% by mass as presented in Table 1.

Comparative Example 4

The dye-sensitized solar cell was fabricated in the same manner as in Example 1 except that the titanium oxide for light scatter in the outermost layer was changed from the rutile crystal-type titanium oxide to the anatase crystal-type titanium oxide, and the content of rutile crystal-type titanium oxide in the entire porous titanium oxide layer was changed from 32% by mass to 3.5% by mass as presented in Table 1.

Comparative Example 5

The dye-sensitized solar cell was fabricated in the same manner as in Example 1 except that the content of rutile crystal-type titanium oxide that is titanium oxide for light scatter in the intermediate layer was changed from 5% by mass to 0% by mass, and the content of rutile crystal-type titanium oxide in the entire porous titanium oxide layer was changed from 32% by mass to 29% by mass as presented in Table 1.

Example 9

The dye-sensitized solar cell was fabricated in the same manner as in Example 1 except that the photosensitizing dye was changed from N719 to N749, the thickness of the intermediate layer was changed from 10 μm to 21 μm, the content of the rutile crystal-type titanium oxide in the entire porous titanium oxide layer was also changed from 32% by mass to 21% by mass, and also the solvent of the dye solution was changed from a mixed solvent of acetonitrile and t-butyl alcohol to 1-propanol as presented in Table 2.

Example 10

The dye-sensitized solar cell was fabricated in the same manner as in Example 1 except that the photosensitizing dye was changed from N719 to N749, the thickness of the intermediate layer was changed from 10 μm to 21 μm, the content of rutile crystal-type titanium oxide that is titanium oxide for light scatter in the intermediate layer was changed from 5% by mass to 0% by mass, the content of the rutile crystal-type titanium oxide in the entire porous titanium oxide layer was changed from 32% by mass to 17% by mass, and also the solvent of the dye solution was changed from a mixed solvent of acetonitrile and t-butyl alcohol to 1-propanol as presented in Table 2.

Example 11

The dye-sensitized solar cell was fabricated in the same manner as in Example 1 except that the photosensitizing dye was changed from N719 to N749, the thickness of the intermediate layer was changed from 10 μm to 21 μm, the titanium oxide for light scatter in the intermediate layer was changed from the rutile crystal-type titanium oxide to the anatase crystal-type titanium oxide, the content of the rutile crystal-type titanium oxide in the entire porous titanium oxide layer was changed from 32% by mass to 17% by mass, and also the solvent of the dye solution was changed from a mixed solvent of acetonitrile and t-butyl alcohol to 1-propanol as presented in Table 2.

Comparative Example 6

The dye-sensitized solar cell was fabricated in the same manner as in Example 10 except that the outermost layer was not formed on the intermediate layer and the content of the rutile crystal-type titanium oxide in the entire porous titanium oxide layer was changed from 17% by mass to 0% by mass as presented in Table 2.

Comparative Example 7

The dye-sensitized solar cell was fabricated in the same manner as in Example 11 except that the outermost layer was not formed on the intermediate layer and the content of the rutile crystal-type titanium oxide in the entire porous titanium oxide layer was changed from 17% by mass to 0% by mass as presented in Table 2.

Comparative Example 8

The dye-sensitized solar cell was fabricated in the same manner as in Example 9 except that the outermost layer was not formed on the intermediate layer and the content of the rutile crystal-type titanium oxide in the entire porous titanium oxide layer was changed from 21% by mass to 4.2% by mass as presented in Table 2.

[Characteristic Evaluation]

The photoelectric conversion characteristics and the light trapping effect were evaluated for the dye-sensitized solar cells of Examples 1 to 11 and Comparative Examples 1 to 8 obtained as described above.

(1) Photoelectric Conversion Characteristic

The photoelectric conversion efficiency η (%) was measured for the dye-sensitized solar cells of Examples 1 to 8 and Comparative Examples 1 to 5 among the dye-sensitized solar cells of Examples 1 to 11 and Comparative Examples 1 to 8 obtained as described above. Thereafter, the rate of increase in photoelectric conversion efficiency η was calculated based on the following Equation by taking Comparative Example 1 as the reference. The results are presented in Table 1.

Rate of increase in photoelectric conversion efficiency (%)=100×(photoelectric conversion efficiency of Examples or Comparative Examples− photoelectric conversion efficiency of Comparative Example 1)/photoelectric conversion efficiency of Comparative Example 1

At this time, the measurement of the photoelectric conversion efficiency was performed using the Xe lamp solar simulator (YSS-150 manufactured by YAMASHITA DENSO CORPORATION) and the I-V tester (MP-160 manufactured by EKO Instruments Ltd.).

In addition, the photoelectric conversion efficiency η (%) was also measured for the dye-sensitized solar cells of Examples 9 to 11 and Comparative Examples 6 to 8 having a different photosensitizing dye from Examples 1 to 8 and Comparative Examples 1 to 5. Thereafter, the rate of increase in photoelectric conversion efficiency η was calculated based on the following Equation by taking Comparative Example 6 as the reference. The results are presented in Table 2.

Rate of increase in photoelectric conversion efficiency (%)=100×(photoelectric conversion efficiency of Examples or Comparative Examples−photoelectric conversion efficiency of Comparative Example 6)/photoelectric conversion efficiency of Comparative Example 6

(2) Light Trapping Effect

The haze ratio was taken as the indicator for the light trapping effect. The haze ratio of the dye-sensitized solar cell of Examples 1 to 11 and Comparative Examples 1 to 8 obtained as described above was then measured using a haze meter (HM-150 manufactured by MURAKAMI COLOR RESEARCH LABORATORY Co., Ltd.). The results are presented in Tables 1 and 2.

TABLE 1

| | | Intermediate layer | | | | Outermost layer | | |
| | | Titanium oxide for light absorption | Titanium oxide for light scatter | | | Titanium oxide for light scatter | | |
| | Photo-sensitizing dye | Content of anatase (% by mass) | Content of anatase (% by mass) | Content of rutile (% by mass) | Thickness (μm) | Content of anatase (% by mass) | Content of rutile (% by mass) | Thickness (μm) |
|---|---|---|---|---|---|---|---|---|
| Example 1 | N719 | 95 | — | 5 | 10 | — | 100 | 4 |
| Example 2 | N719 | 95 | — | 5 | 10 | — | 100 | 4 |
| Example 3 | N719 | 95 | — | 5 | 10 | 20 | 80 | 4 |
| Example 4 | N719 | 95 | — | 5 | 10 | 40 | 60 | 4 |
| Example 5 | N719 | 85 | — | 15 | 10 | — | 100 | 4 |
| Example 6 | N719 | 95 | — | 5 | 10 | — | 100 | 4 |
| Example 7 | N719 | 95 | — | 5 | 10 | — | 100 | 4 |
| Example 8 | N719 | 97 | — | 3 | 10 | — | 100 | 4 |
| Comparative Example 1 | N719 | 100 | — | — | 10 | — | — | — |
| Comparative Example 2 | N719 | 100 | — | — | 10 | 100 | — | 4 |
| Comparative Example 3 | N719 | 95 | 5 | — | 10 | — | — | — |
| Comparative Example 4 | N719 | 95 | — | 5 | 10 | 100 | — | 4 |
| Comparative Example 5 | N719 | 100 | — | — | 10 | — | 100 | 4 |

| | Shape of titanium oxide | Average particle size of rutile (nm) | Content of rutile in porous titanium oxide layer (% by mass) | Characteristic evaluation Rate of increase in photoelectric conversion efficiency (%) (Comparative Example 1 is reference) | Haze ratio (%) |
|---|---|---|---|---|---|
| Example 1 | Spherical | 180 | 32 | 54 | 96 |
| Example 2 | Spherical | 550 | 32 | 42 | 96 |
| Example 3 | Spherical | 180 | 26 | 48 | 95 |
| Example 4 | Spherical | 180 | 21 | 40 | 94 |
| Example 5 | Spherical | 180 | 40 | 43 | 96 |
| Example 6 | Spherical | 40 | 32 | 36 | 90 |
| Example 7 | Spherical | 100 | 32 | 42 | 96 |
| Example 8 | Spherical | 180 | 31 | 52 | 96 |
| Comparative Example 1 | Spherical | — | 0 | 0 | 50 |
| Comparative Example 2 | Spherical | — | 0 | 30 | 92 |
| Comparative Example 3 | Spherical | — | 0 | 24 | 75 |
| Comparative Example 4 | Spherical | 100 | 3.5 | 32 | 76 |
| Comparative Example 5 | Spherical | 100 | 29 | 34 | 98 |

TABLE 2

| | | Intermediate layer | | | | Outermost layer | | |
| --- | --- | --- | --- | --- | --- | --- | --- | --- |
| | | Titanium oxide | | | | Titanium oxide for light scatter | | |
| | | Titanium oxide for light absorption | Titanium oxide for light scatter | | | | | |
| | Photo-sensitizing dye | Content of anatase (% by mass) | Content of anatase (% by mass) | Content of rutile (% by mass) | Thickness (μm) | Content of anatase (% by mass) | Content of rutile (% by mass) | Thickness (μm) |
| Example 9 | N749 | 95 | — | 5 | 21 | — | 100 | 4 |
| Example 10 | N749 | 100 | — | — | 21 | — | 100 | 4 |
| Example 11 | N749 | 95 | 5 | — | 21 | — | 100 | 4 |
| Comparative Example 6 | N749 | 100 | — | — | 21 | — | — | — |
| Comparative Example 7 | N749 | 95 | 5 | — | 21 | — | — | — |
| Comparative Example 8 | N749 | 95 | — | 5 | 21 | — | — | — |

| | | | | Characteristic evaluation | |
| --- | --- | --- | --- | --- | --- |
| | Shape of titanium oxide | Average particle size of rutile (nm) | Content of rutile in porous titanium oxide layer (% by mass) | Rate of increase in photoelectric conversion efficiency (%) (Comparative Example 1 is reference) | Haze ratio (%) |
| Example 9 | Spherical | 180 | 21 | 49 | 97 |
| Example 10 | Spherical | 180 | 17 | 36 | 96 |
| Example 11 | Spherical | 180 | 17 | 43 | 95 |
| Comparative Example 6 | Spherical | — | 0 | 0 | 63 |
| Comparative Example 7 | Spherical | — | 0 | 20 | 86 |
| Comparative Example 8 | Spherical | 180 | 4.2 | 26 | 89 |

From the results presented in Table 1 and Table 2, it was found that the dye-sensitized solar cells of Examples 1 to 11 have a higher haze ratio and also a higher rate of increase in photoelectric conversion efficiency than the dye-sensitized solar cells of Comparative Examples 1 to 8.

Consequently, it has been confirmed that the photoelectric conversion characteristics can be improved according to the dye-sensitized solar cell of the invention.

EXPLANATIONS OF REFERENCE NUMERALS

10 . . . working electrode
13 . . . porous titanium oxide layer
13a . . . outermost layer
13b . . . intermediate layer
15 . . . conductive substrate
20 . . . counter electrode
40 . . . electrolyte
100 . . . dye-sensitized solar cell

The invention claimed is:

1. A dye-sensitized solar cell comprising:
a working electrode having a porous titanium oxide layer on a conductive substrate capable of transmitting light;
a counter electrode disposed so as to face the working electrode;
a photosensitizing dye supported on the porous titanium oxide layer of the working electrode; and
an electrolyte disposed between the working electrode and the counter electrode,
wherein the porous titanium oxide layer includes an anatase crystal-type titanium oxide composed of an anatase crystal and a rutile crystal-type titanium oxide composed of a rutile crystal,
the rutile crystal-type titanium oxide is spherical,
an average particle size of the rutile crystal-type titanium oxide is from 50 nm to 700 nm,
the porous titanium oxide layer includes a laminate consisting of a plurality of layers, and an outermost layer disposed at a position farthest from the conductive substrate of the laminate contains the rutile crystal-type titanium oxide,
at least one intermediate layer provided between the outermost layer and the conductive substrate in the laminate contains the anatase crystal-type titanium oxide,
a first intermediate layer disposed at a position closest to the outermost layer of the at least one intermediate layer contains the anatase crystal-type titanium oxide and the rutile crystal-type titanium oxide,
a content of the rutile crystal-type titanium oxide in the outermost layer is greater than a content of the rutile crystal-type titanium oxide in the at least one intermediate layer, and
a content difference between the content of the rutile crystal-type titanium oxide in the at least one intermediate layer and the content of the rutile crystal-type titanium oxide in the outermost layer is 70% by mass or more and less than 100% by mass, and
a content of the rutile crystal-type titanium oxide in the outermost layer is more than 70% by mass and 100% by mass or less.

2. The dye-sensitized solar cell according to claim 1, wherein the average particle size of the rutile crystal-type titanium oxide is 500 nm or less.

3. The dye-sensitized solar cell according to claim 1, wherein a content of the rutile crystal-type titanium oxide in the first intermediate layer of the at least one intermediate layer is from 3 to 15% by mass.

4. The dye-sensitized solar cell according to claim 1, wherein a content of the rutile crystal-type titanium oxide in the porous titanium oxide layer in its entirety is from 5 to 50% by mass.

* * * * *